UNITED STATES PATENT OFFICE.

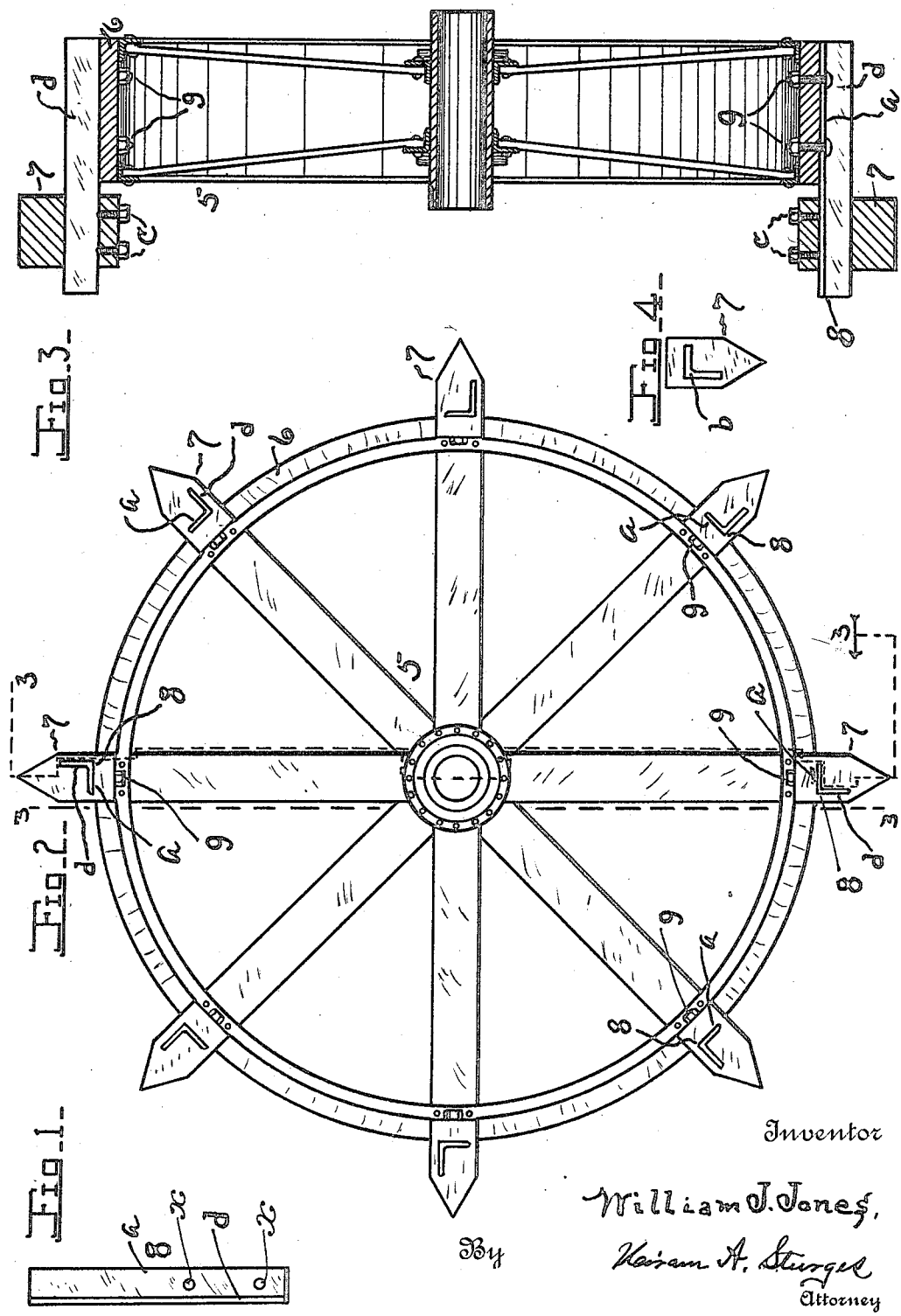

WILLIAM J. JONES, OF GREGORY, SOUTH DAKOTA.

RESISTANCE APPENDAGE FOR TRACTOR-WHEELS.

1,384,068.   Specification of Letters Patent.   Patented July 12, 1921.

Application filed June 28, 1920. Serial No. 392,487.

*To all whom it may concern:*

Be it known that I, WILLIAM J. JONES, a citizen of the United States, residing at Gregory, in the county of Gregory and State of South Dakota, have invented certain new and useful Improvements in Resistance Appendages for Tractor-Wheels, of which the following is a specification.

This invention relates to a means for providing resistance for vehicle wheels and more particularly for the wheels of tractors, to prevent "spinning" of the wheels while driving over muddy ground or upon ice or smooth surfaces. The invention includes appendages which may be readily secured to the tire and may be so adjusted that they will be disposed at a suitable distance from the outer side of a wheel for the purpose mentioned, the construction requiring few and simple parts so that manufacture will be practical, and of such form and arrangement that they may be applied to any tractor of ordinary type.

The invention consists of the novel construction, combination and arrangement of parts as described herein and claimed, and as illustrated in the accompanying drawing, wherein,—

Figure 1 is a plan view of one of the angle-bars employed. Fig. 2 is a view in side elevation of a tractor wheel with the tire appendages mounted thereon. Fig. 3 is a transverse section through the wheel, the view being a section on line 3—3 looking to a second line 3—3. Fig. 4 is an end view of one of the wedge-shaped appendages employed.

Referring now to the drawing for a more particular description, the invention is illustrated in connection with a tractor wheel 5 which may have any ordinary construction, its tire being indicated at 6.

In order that the wheels of tractors or similar vehicles will be prevented from sliding when driving upon soft ground or upon muddy surfaces I provide a plurality of ground-engaging appendages 7, these being maintained near the outer side of the wheel, a plurality of angle-bars 8 being provided and disposed transversely of the tire to project outwardly thereof, one of the flanges $a$ of each bar being provided with apertures $x$ as best shown in Fig. 1 and adapted to be secured to the tire by means of bolts 9.

Any suitable number of angle-bars and appendages may be employed, these being disposed at uniform intervals of the tire. The ground-engaging appendages are each, preferably, of wedge-shape, and as best shown in Fig. 4, are provided with an L-shaped aperture $b$ corresponding to the form, in cross-section, of an angle-bar.

As thus described, the appendages may be readily mounted upon the angle-bars, said bars engaging in the apertures $b$, the parts being so proportioned that the wedge-shaped appendages may have a slidable movement upon the bars, at the outer side of the wheel, and to be disposed at lesser or greater distances from the tire, as may be required, set-screws or bolts $c$ being employed for securing the appendages to said angle-bars.

It will be appreciated that, by use of the device as described, tractor-wheels may be equipped at a very nominal expense with appendages which will prevent "spinning" when driving over soft muddy ground, also that these appendages may be readily applied to the tires or removed therefrom, as may be desired. Also it will be noted that the appendages 7, by means of the set-screws or bolts $c$ may be adjusted longitudinally of the angle-bars to be disposed at a predetermined distance from the tire, this being of advantage to modify resistance, and when a greater degree of resistance is required, the distance between the appendages and tire may be increased. Also it will be seen that when the apertured flanges $a$ engage the periphery of the tire, the flanges $d$ will be disposed radially of the wheel, as an additional aid to resistance. Also, the fact that the appendages 7 are of wedge-shape, is considered to be an advantage, during operation, to permit mud to drop more readily from their convergent ends.

While I have described construction in detail, I do not wish to be understood as limiting myself in this respect, and changes in form, size, proportion and minor details may be made, as found to be of advantage, said changes to be determined by the scope of the invention as claimed.

I claim,—

1. In ground-engaging appendages for the tires of tractor-wheels, a plurality of bars adapted to be disposed transversely of the tire, a plurality of appendages slidably mounted on the bars, and set-screws or bolts engaging the appendages and also engaging the bars for maintaining the appendages at one of the sides at a predetermined distance from the tire.

2. In ground-engaging devices for the tires of vehicle wheels, a plurality of bars disposed transversely of the tire and projecting outwardly of the side of the wheel, each bar having a flange adapted to lie upon the tire and having a flange disposed radially of the wheel, a plurality of apertured appendages each being disposed with its aperture receiving a bar, and means to removably secure the appendages to said bar.

3. In ground-engaging devices for the tires of tractor-wheels, a plurality of wedge-shaped appendages each being provided with an aperture L-shaped in plan, a plurality of bars adapted to be disposed transversely of the tire, each being adapted to be inserted within and to approximately fill the aperture of an appendage, and set-screws or equivalent members engaging the appendages and said bars for maintaining the appandages at a predetermined distance from the tire.

4. In ground-engaging devices for the tires of vehicle wheels, a plurality of angle-bars mounted upon the tire and projecting outwardly of one of the sides of the wheel, each bar having one of its flanges engaging the tire and having a flange disposed radially of the wheel, a plurality of appendages approximately of wedge-shape, each having an aperture approximately of L-shape in plan and adapted to be disposed with its aperture receiving an angle-bar, and a plurality of set-screws traversing the appendages for engaging said angle-bars.

In testimony whereof, I have affixed my signature in presence of two witnesses.

WILLIAM J. JONES.

Witnesses:
L. H. NELLHAWPEN,
FRANK LUNDAK.